United States Patent
Arndt et al.

(10) Patent No.: US 9,151,681 B2
(45) Date of Patent: Oct. 6, 2015

(54) TEMPERATURE DETECTOR HAVING DIFFERENT TYPES OF INDEPENDENT SENSORS

(71) Applicant: Progress Rail Services Corporation, Albertville, AL (US)

(72) Inventors: Donald J. Arndt, Napoleon, MO (US); Mark J. Bartonek, Inchep, MO (US)

(73) Assignee: Progress Rail Services Corporation, Albertville, AL (US)

(*) Notice: Subject to any disclaimer, the term of this patent is extended or adjusted under 35 U.S.C. 154(b) by 308 days.

(21) Appl. No.: 13/719,445

(22) Filed: Dec. 19, 2012

(65) Prior Publication Data

US 2014/0169398 A1 Jun. 19, 2014

(51) Int. Cl.
G01K 1/00 (2006.01)
G01K 15/00 (2006.01)
G01K 1/02 (2006.01)

(52) U.S. Cl.
CPC .............. G01K 15/007 (2013.01); G01K 1/026 (2013.01)

(58) Field of Classification Search
USPC ....................................... 374/1, 166, 110, 142
See application file for complete search history.

(56) References Cited

U.S. PATENT DOCUMENTS

| | | | |
|---|---|---|---|
| 3,879,992 A * | 4/1975 | Bartera | 73/24.01 |
| 4,403,296 A * | 9/1983 | Prosky | 702/86 |
| 4,433,923 A * | 2/1984 | Rascati et al. | 374/112 |
| 5,331,311 A | 7/1994 | Doctor | |
| 5,677,533 A | 10/1997 | Yaktine et al. | |
| 6,191,399 B1 * | 2/2001 | Van Bilsen | 219/497 |
| 6,823,242 B1 * | 11/2004 | Ralph | 701/19 |
| 7,693,673 B2 | 4/2010 | Luo et al. | |
| 7,769,564 B2 | 8/2010 | Church | |
| 7,876,204 B2 * | 1/2011 | Taylor | 340/435 |
| 8,160,832 B2 | 4/2012 | Luo et al. | |
| 8,280,675 B2 * | 10/2012 | Church et al. | 702/130 |
| 8,430,363 B2 * | 4/2013 | Hesser et al. | 246/169 R |
| 8,478,480 B2 * | 7/2013 | Mian et al. | 250/316.1 |
| 2006/0023768 A1 * | 2/2006 | Ishihara et al. | 374/142 |
| 2006/0076461 A1 | 4/2006 | DeRose et al. | |
| 2007/0036197 A1 * | 2/2007 | Huttenlocher et al. | 374/1 |
| 2008/0164380 A1 | 7/2008 | Gilbertson | |
| 2008/0317086 A1 * | 12/2008 | Santos et al. | 374/1 |
| 2009/0021314 A1 * | 1/2009 | Boerstler et al. | 331/66 |
| 2010/0155543 A1 | 6/2010 | Hesser et al. | |
| 2013/0107905 A1 * | 5/2013 | Campbell et al. | 374/1 |
| 2014/0088801 A1 * | 3/2014 | Bartonek | 701/19 |
| 2014/0140364 A1 * | 5/2014 | Charles et al. | 374/1 |

* cited by examiner

*Primary Examiner* — Mirellys Jagan
(74) *Attorney, Agent, or Firm* — Finnegan, Henderson, Farabow, Garrett & Dunner, LLP

(57) ABSTRACT

The present disclosure is directed to a temperature detector for detecting a temperature of a component. The temperature detector may receive a first signal indicative of the temperature of the component, with the first signal being received from a first type of temperature sensor. The temperature detector may further receive a second signal indicative of the temperature of the component, with the second signal being received from a second type of temperature sensor different from the first type of temperature sensor. The temperature detector may combine the first and second signals to generate an output indicative of the temperature of the component.

17 Claims, 4 Drawing Sheets

TEMPERATURE DETECTOR HAVING DIFFERENT TYPES OF INDEPENDENT SENSORS

TECHNICAL FIELD

The present disclosure relates generally to a temperature detector and, more particularly, a temperature detector having different types of independent sensors.

BACKGROUND

Monitoring systems for the railroad industry provide methods and apparatus for automatic determination of the temperatures of components including wheels and wheel bearings on passing trains, infrared (IR) radiation radiating from the wheel or wheel bearing of a train traveling along a train track is indicative of a temperature or temperature range of the wheel or wheel bearing. IR scanners and associated circuits for detecting an overheated wheel or wheel bearing are available commercially. Some systems utilize an IR detector located in close proximity to the railroad tracks. The IR detector determines the presence of radiated IR waves within a predefined range of wavelengths. The IR detector also produces an output signal indicative of the power or intensity of the sensed IR radiation within the predefined range.

One problem associated with these types of systems for detecting a temperature range or a temperature of a railroad train wheel or wheel hearing involves inaccuracies that may result under different conditions. In situations where the range of detected IR waves is attenuated or filtered by external sources such as blowing snow, wind, rain, or other weather conditions, the result is an inaccurate detection of a hot wheel or hot bearing condition. Accurate detection of an overheated component such as a wheel or wheel bearing allows for corrective actions to be taken before the overheated component breaks down or fails.

One attempt to avoid the problem of inaccurate detection of wheel and bearing temperatures in a harsh environment is disclosed in U.S. Pat. No. 6,872,945 to M. Bartonek that issued on Mar. 29, 2005 (the '945 patent). The '945 patent discloses an apparatus that includes a sensor for sensing IR radiation radiating from a train wheel or bearing within two or more IR wavelength ranges, where each wavelength range does not substantially overlap with any other wavelength range. The sensor generates signals indicative of the sensed IR radiation in each of the wavelength ranges. A processor determines a temperature range or a temperature of the wheel or wheel bearing from the generated signals.

The temperature detection system of the '945 patent may determine a temperature of a wheel or wheel bearing of a train traversing a railroad track. Furthermore, the temperature detection system of the '945 patent may not be susceptible to variations in the amplitude, intensity, or power of the detected IR radiation. However, this solution may still provide a less than optimal temperature detection system. The temperature detection system of the '945 patent may still be susceptible to certain disadvantages associated with the particular type of temperature detecting technology that is being used. For example, the temperature detection system of the '945 patent may use an array of the same type of detectors, each of which may detect a limited bandwidth range, but each of which may still be susceptible to the same disadvantages associated with the type of technology being used, such as slow response time, or susceptibility to errors caused by microphonics.

The system and method of the present disclosure solves one or more problems set forth above and/or other problems in the art.

SUMMARY

In one aspect, the present disclosure is directed to a method of detecting the temperature of a component. The method may include receiving a first signal indicative of a temperature of the component. The first signal may be received from a first type of temperature sensor. The method may further include receiving a second signal indicative of a temperature of the component. The second signal may be received from a second type of temperature sensor different from said first type of temperature sensor. The method may include combining the first and second signals to generate an output indicative of the temperature of the component.

In another aspect of the disclosure, a system for detecting the temperature of a component, the system may include at least two types of temperature sensors, each employing a different type of temperature sensing technology. The system may also include a processor configured to combine a first signal from a first one of the two types of temperature sensors and a second signal from a second one of the two types of temperature sensors different from the first one of the two types of temperature sensors to generate an output indicative of a temperature of the component.

DETAILED DESCRIPTION

Figure 1:
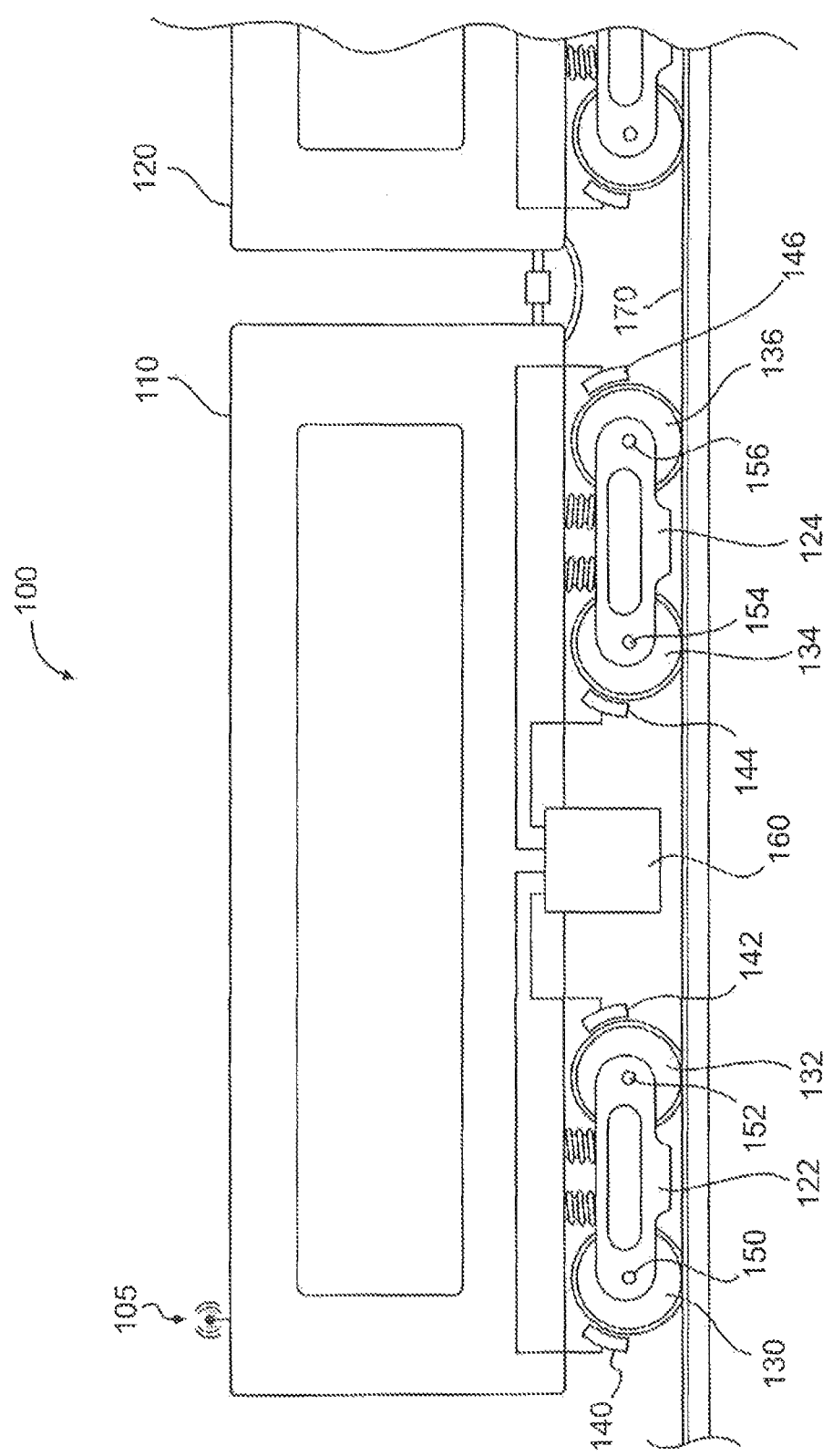
FIG. 1 is a diagrammatic illustration of an exemplary disclosed train.

FIG. 1 illustrates a portion of a train 100 including one or more cars 110, 120. Each car, such as shown for car 110, may include a plurality of trucks, such as trucks 122 and 124. A car may have as many as ten or more trucks, although more typically the number of trucks is two per car. Each truck 122, 124 may include two or more axles, with wheel bearings 150, 152 shown at one end of each of the axles on truck 122, and wheel bearings 154, 156 shown at one end of each of the axles on truck 124.

In addition, train 100 may include a pneumatic braking system, which may include a main air line from the locomotive (not shown), from which pressurized air is supplied to various brake valves, such as brake valve 160 shown in FIG. 1. Brake valve 160 may control the operation of one or more brake cylinders (not shown), which may control the actuation of one or more brakes 140, 142, 144, 146. Each brake 140, 142, 144, 146 may include friction material configured for contact against respective wheels 130, 132, 134, 136. One of ordinary skill in the art will recognize that other alternative brake systems may include disc brake systems or hydraulic fluid braking systems.

In various implementations, each truck 122, 124 with two or more axles, with wheel bearings 150, 152, 154, 156 located at the ends of the axles, and two wheels 130, 132, 134, 136 per axle, may be associated with a single brake valve 160. Wheels 130, 132, 134, 136 are each shown at one end of their respective axles, and may be paired with matching wheels (not shown) at the opposite ends of their respective axles. In alternative implementations, each brake valve 160 may be associated with more than one truck 122, 124. Braking systems associated with each brake valve 160 may operate, (and may fail) independently of one another. Various components may wear out from continued use, and worn components may result in generation of excessive heat, which in turn may lead to failure of the components or potentially unsafe conditions. Therefore, various implementations of the present disclosure may monitor wheel temperatures, or wheel bearing temperatures, as discussed in detail below, for wheels that are connected to the same brake valve. Furthermore, the following discussions of individual wheels, associated individual wheel brakes, etc., will be understood by one of ordinary skill in the art to also apply to groupings of wheels, such as all of the wheels on a single truck, or all of the wheels on a pair of trucks connected with the same brake valve, etc.

Figure 2:
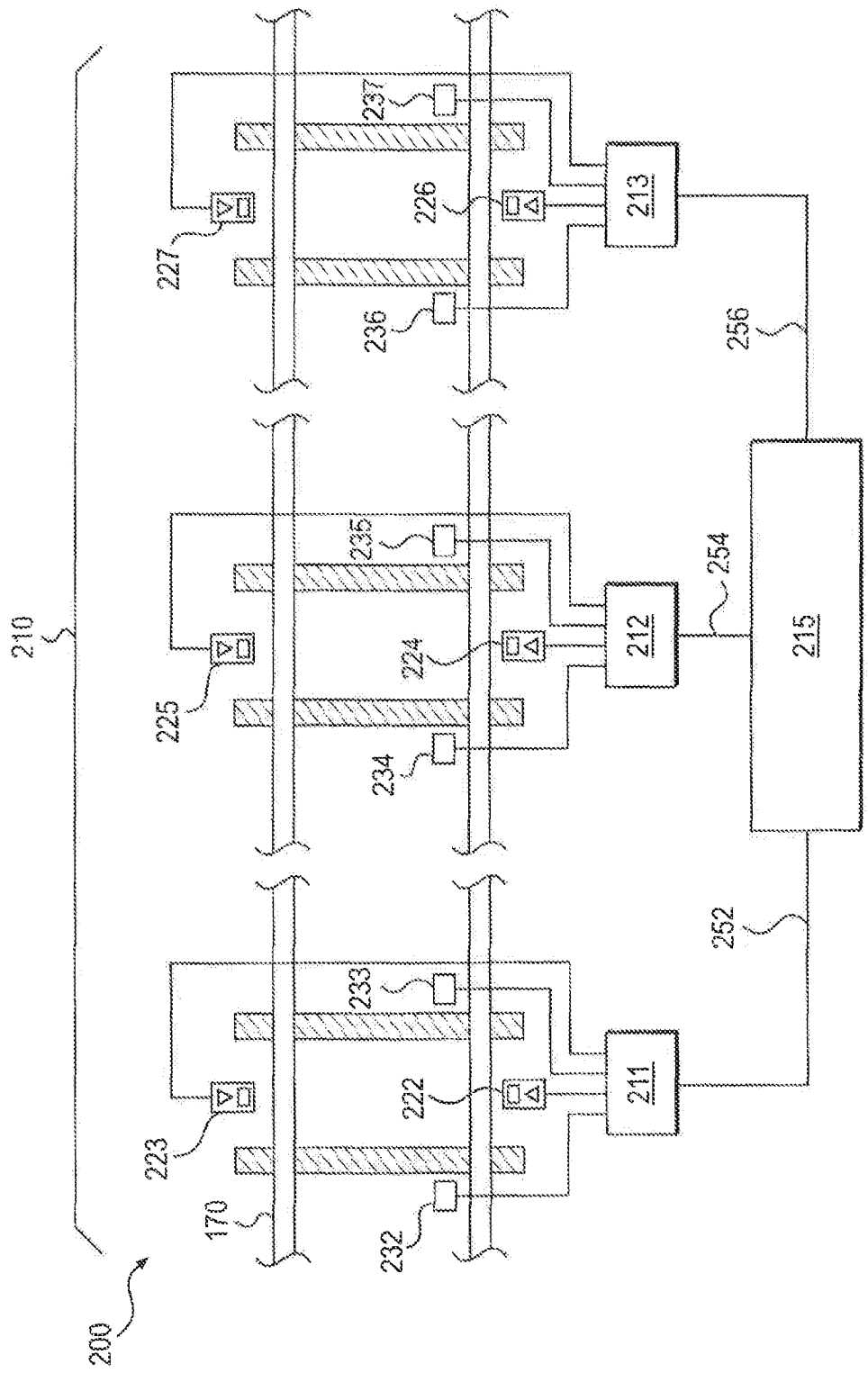
FIG. 2 is a schematic illustration of an exemplary disclosed temperature monitoring system that may be used with the train of FIG. 1.

FIG. 2 illustrates an example implementation of the disclosure directed to a detection system 200 for detecting the temperature of components including wheels 130, 132, 134, 136, and wheel bearings 150, 152, 154, 156 on train cars 110, 120 (shown in FIG. 1) moving along rails 170 of a train track. Wayside temperature detectors 211, 212, 213 may be positioned along rails 170 to automatically sense the temperature of wheels 130, 132, 134, 136 or wheel bearings 150, 152, 154, 156 of a passing train. Signals output from temperature detectors 211, 212, 213 may be processed to enable an alarm when the wheel or wheel bearing temperatures become too great for continued safe operation, or when the sensed temperatures may be exhibiting a magnitude or trend in magnitudes that may assist in determining when to schedule preventative maintenance for avoidance of possible failures or unsafe conditions.

Temperature detectors 211, 212, 213 in FIG. 2 may be positioned and configured to detect temperatures of the wheel bearings, wheels or other components of a passing train. Temperature detectors 211, 212, and 213 may include temperature sensors 222-227, which are configured to convert sensed infrared (IR) radiation energy produced by a component such as a passing train wheel or wheel bearing to an electrical signal that is proportional to the amount of heat output by the wheel or wheel bearing relative to ambient temperature. Temperature detectors 211, 212, 213 may also include temperature sensors 222-227 that detect photons emitted from an object being measured. A photodetector may be a semiconductor photodiode device that generates electrical current or electron excitation when a light source or other source of radiant energy projects onto its surface, or when light or other radiant energy enters a diode semiconductor device, such as GaAs or InGaAs.

Temperature detectors 211, 212, 213, and temperature sensors 222-227 may be located in different positions relative to rails 170. Temperature detectors 211, 212, 213, and temperature sensors 222-227 may be located in positions adjacent rails 170 and in between rails 170. They may also be located in housings configured to replace select ties provided to support rails 170 (sometimes referred to as "sleeper ties"). Other locations for temperature detectors 211, 212, 213, and temperature sensors 222-227, may include positions adjacent rails 170 and to the outside of rails 170, at angles looking up from ground level, at angles looking in a horizontal direction from an elevated position adjacent rails 170 and at approximately the height of wheel bearings 150, 152, 154, 156, and at angles looking down toward ground level from an elevated position adjacent rails 170. One of ordinary skill in the art will recognize that there are a variety of temperature sensing technologies suitable for use with various implementations of the disclosure.

As shown in FIG. 2, at least a first temperature sensor 222, and a second temperature sensor 223, may be disposed on opposite sides of rails 170 in order to be able to detect the temperatures of wheels or wheel bearings on both sides of a passing train car. Temperature sensors 224 and 225 associated with temperature detector 212, may be positioned on opposite sides of rails 170 at the same location or at predetermined spacing, and at a predetermined spaced interval along rails 170 from temperature detector 211. Optional additional pairs of temperature sensors associated with additional temperature detectors, such as temperature sensors 226 and 227 associated with temperature detector 213, may also be positioned on opposite sides of rails 170 at the same location or at predetermined spacing, and disposed at predetermined spaced intervals further along rails 170 in a direction of train travel along rails 170.

The spaced pairs of temperature sensors may be included in a predesignated detection area 210 along rails 170. Multiple detection areas similar to detection area 210 may be spaced along rails 170, with each detection area including two or more spaced pairs of temperature sensors. The detection areas may be located along stretches of train track over varying terrains. The pairs of temperature sensors 222 and 223, 224 and 225, and 226 and 227 placed along opposite sides of rails 170 may produce signals indicative of the temperatures for each wheel or wheel bearing on a per axle basis, and may provide those signals to associated temperature detectors 211, 212, 213, respectively. Each temperature detector 211, 212, 213 may also include associated wheel position sensors 232 and 233, 234 and 235, and 236 and 237, respectively.

As a train ear wheel passes each temperature detector 211, 212, 213, the associated pairs of wheel position sensors 232, 233, 234, 235 may provide signals to the associated temperature detectors 211, 212, 213. Each associated temperature detector 211, 212, 213 may use the signals from wheel position sensors 232, 233, 234, 234 in defining a window when signals from associated temperature sensors 222-227 may be received and converted into temperatures of passing wheels 130, 132, 134, 136 or wheel bearings 150, 152, 154, 156. Each of temperature detectors 211, 212, and 213 may be positioned at wayside stations along rails 170, and may be communicatively coupled with a processor 215 of detection system 200. Temperature signals 252, 254, 256 may be communicated from temperature detectors 211, 212, 213, respectively, to processor 215. Alternatively, each temperature detector 211, 212, 213 may include an autonomous processor configured to perform various functions on the data received from temperature sensors 222-227.

Figure 3:
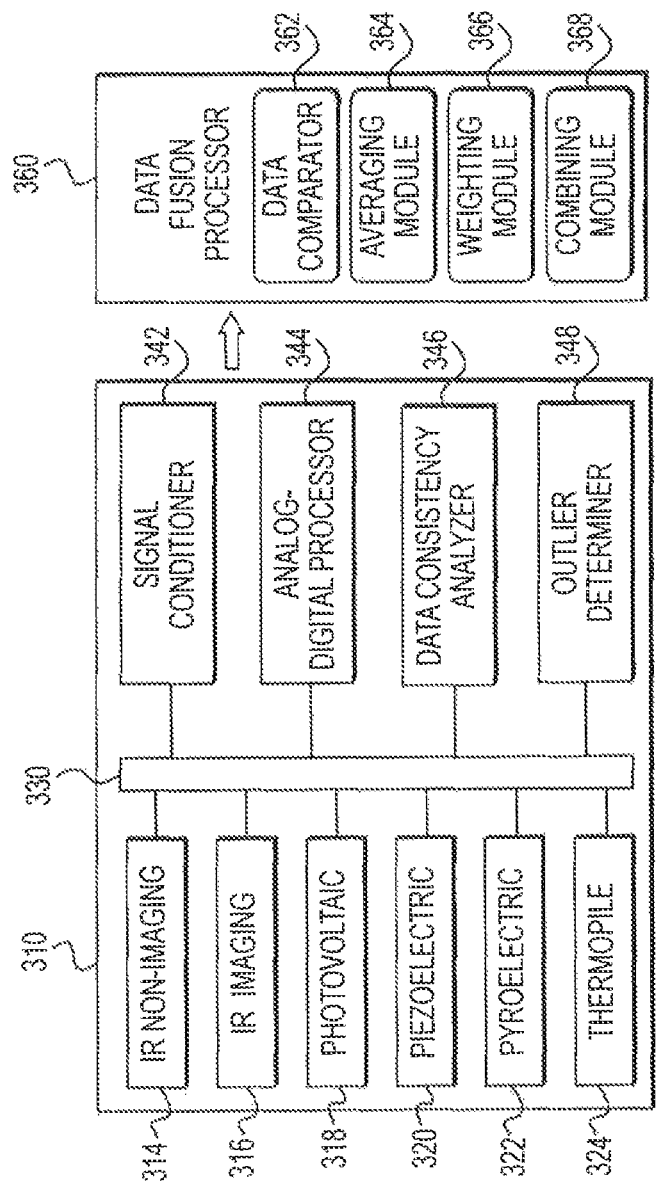
FIG. 3 is a schematic illustration of exemplary features of the exemplary disclosed temperature monitoring system of FIG. 2.

As shown in FIG. 3, one or more of temperature detectors 211, 212, 213 (shown in FIG. 2) may include or be connected to a temperature signal processor 310, which may be configured to receive signals 252, 254, 256 from temperature detectors 211, 212, 213 employing a variety of technologically different types of temperature sensors 222-227. The signals received by temperature signal processor 310 may be indicative of the temperatures of components on a passing train. Temperature signal processor 310 may be configured to process those signals in various ways that may include manipulating analog signals to prepare them for further processing using a signal conditioner 342, converting analog signals to digital signals using an analog-to-digital processor 344, determining consistency between the acquired data using a data consistency analyzer 346, and determining outliers in the acquired data that may be ignored using an outlier determiner 348.

Temperature sensors 222-227 (shown in FIG. 2) may be selected from a variety of different technological types of sensors having different characteristics or operating principles. Such types of sensors may include, but are not limited to, IR non-imaging sensors 314, IR imaging sensors 316, photovoltaic sensors 318, piezoelectric sensors 320, pyroelectric sensors 322, and thermopile sensors 324. Although these types of sensors are shown as separate boxes for illustrative purposes, one of ordinary skill in the art will recognize that some of these types of sensors may not be mutually exclusive, and there may be some overlap between the different types. For example, an IR imaging sensor may convert IR rays into voltage using thermopiles. Multiple sensors may be arranged in a focal plane array to produce an IR imaging sensor, or a single sensor made from a semiconductor material such as Indium Antimonide (InSb) may be provided in a mechanically scanned imaging system.

In the exemplary implementation illustrated in FIG. 3, temperature signal processor 310 may be configured such that signals output from the various types of sensors 314, 316, 318, 320, 322, 324 may be communicatively coupled through a bus, or other communication interface 330, to various processing engines, subroutines, or modules, such as signal conditioner 342, analog-to-digital processor 344, data consistency analyzer 346, and outlier determiner 348. Temperature signal processor 310 may further include, or be communicatively coupled with a data fusion processor 360. Data fusion processor 360 may be configured to include functionality such as comparison of the data received from the various types of temperature sensors 314, 316, 318, 320, 322, 324 using data comparator 362. An averaging module 364 may be configured to average the results received from the various types of temperature sensors. A weighting module 366 may be configured to provide different weights to data received based on various parameters that may include the results determined by data consistency analyzer 346 and outlier determiner 348. A combining module 368 may also be provided as part of data fusion processor 360, and may be configured to combine data received from one or more of the various types of temperature sensors 314, 316, 318, 320, 322, 324. Temperature signal processor 310 and data fusion processor 360 may be provided as one or more autonomous processors associated with each of temperature detectors 211, 212, 213, or as part of processor 215 (shown in FIG. 2). Temperature signal processor 310, data fusion processor 360, and processor 215 may be part of a server, client, network infrastructure, mobile computing platform, or a stationary computing platform, one or more of which may be contained as part of a temperature detector 211, 212, 213, in a dispatch office, on the train, in a single wayside housing, multiple wayside housings, or at remote locations communicatively coupled over wired or wireless networks.

As explained above, temperature sensors 222-227 (shown in FIG. 2) may be selected from a group of technologically different types of temperature sensors that may each employ different technical principles of operation. Accordingly, the different types of temperature sensors may each be independent from one another and may each have different advantages and different disadvantages, or different strengths and different weaknesses. A fusion or combination of the data received from technologically different types of sensors 314, 316, 318, 320, 322, 324 may therefore result in an output 370 that is more accurate and reliable than an output generated when data is received only from the same types of sensors.

Temperature detectors 211, 212, 213 capable of providing data indicative of the temperature of wheels 130, 132, 134, 136 and wheel bearings 150, 152, 154, 156 on a passing train 100 may include infrared (IR) sensors that react to IR radiation emitted by wheels 130, 132, 134, 136 and wheel bearings 150, 152, 154, 156 during operation of train 100 as a result of friction, transfers of vibrational energy, or other conditions that result in the generation of thermal energy. The IR detectors may receive IR radiation emitted from wheels 130, 132, 134, 136 or wheel bearings 150, 152, 154, 156 as a train passes the location of the IR detectors, and the IR radiation may be focused through one or more lenses, reflected by one or more reflective optics, or otherwise processed before reaching the IR detectors.

Two main types of IR detectors may include thermal and photonic detectors. The thermal effects of incident IR radiation may be detected in accordance with many temperature dependent phenomena. Examples of these temperature dependent phenomena may include changes in the electrical resistance of the material of the temperature sensors, changes in physical characteristics of the temperature sensors, and excitation of electrons in the sensors caused by impingement of photons on the sensors. As discussed above, different types of IR detectors may include IR non-imaging sensors, IR imaging sensors; semiconductor IR detectors made from mercury cadmium telluride (HgCdTe) (sometimes referred to as MerCaT detectors), semiconductor IR detectors made from indium antimonide (InSb), semiconductor IR detectors made from mercury zinc telluride (HgZnTe), semiconductor IR detectors made from III-V semiconductor materials such as GaAs and AlGaAs, silicon-based bolometers, photon-counting superconducting tunnel junction (STJ) arrays, quantum well IR photodetectors (QWIP), quantum dot IR photodetectors (QDIP), based on either a colloidal or type-II superlattice structure, photovoltaic sensors, piezoelectric sensors, pyroelectric sensors, and thermopiles or groups of thermocouples. Some of the relative advantages and disadvantages, or strengths and weaknesses of the different types of temperature detectors are discussed below.

An IR non-imaging sensor may collect IR radiation only at a single point, while an IR imaging sensor may collect IR radiation at multiple points, which can form an array, and can provide data that may be used to create one or more thermal images. In the process of monitoring and measuring the temperature of wheels 130, 132, 134, 136, or wheel bearings 150, 152, 154, 156, there may be advantages and disadvantages associated with different types of sensors such as thermal and photonic detectors, and IR imaging and IR non-imaging detectors. Therefore, by employing two or more technologically different types of temperature sensors and combining or fusing the data acquired from the different types of sensors, reliability and consistency of the acquired data may be improved. Technologically different "types" of temperature sensors, as referred to throughout this disclosure, means types of temperature sensors that rely on different principles of operation, have different operational characteristics, or different properties, and that therefore may have different advantages and disadvantages, or strengths and weaknesses under different conditions and circumstances.

If several different types of sensors measure a temperature of a component, either at the same position and time, or at different positions and times, and one of the sensors is inconsistent with the rest, the inconsistent sensor is more likely to provide the incorrect data. The system according to various implementations of this disclosure may be configured to allow for the processing of the acquired temperature data in different ways. Acquired temperature data may be processed by executing consistency analysis on the temperature data to identify consistent sets of measurements. An evaluation of inconsistencies between first and second signals may include comparing the first and second signals received as indicative of the temperature of a component at substantially a same position on the component and at substantially the same point in time. Alternatively, an evaluation of inconsistencies between first and second signals may include comparing the first and second signals received as indicative of the temperature of a component at substantially a same position on the component and at two different points in time.

The processing of acquired temperature data may also include determining that certain data may be outliers amongst all of the acquired data, and the system may be configured to accord such outlier data less weight. The system may also be configured to combine data that is determined to be consistent with other data acquired from independent sensors. The system may be further configured to determine the reliability of signals received from individual sensors by determining a signal-to-noise ratio for each of the various sensors. Alternatively, or in addition, the system may be configured to determine the reliability of signals received from individual sensors by evaluating a false alarm rate associated with each of the signals. The system may be configured to combine signals received from different sensors by adaptively weighting one or more of the signals determined to have a higher reliability than the reliability of other signals with a greater weight such that the output temperature is closer to the signal or signals with higher reliability. The system may be configured to combine, or fuse the data acquired from multiple independent sensors in accordance with various functions or algorithms, including averaging the signals received.

IR sensors made from a semiconductor material Mercury Cadmium Telluride (HgCdTe) (also sometimes referred to as "MerCaT" sensors) may detect IR radiation in different atmospheric windows, or ranges of wavelengths. HgCdTe infrared sensors may detect IR radiation in a range of wavelengths from approximately 3 to 5 μm (the mid-wave IR window, abbreviated MWIR) and from approximately 8 to 12 μm (the long-wave window, LWIR). HgCdTe infrared sensors may also detect in the short wave IR SWIR atmospheric windows of 2.2 to 2.4 μm and 1.5 to 1.8 μm.

One possible limitation of LWIR HgCdTe infrared sensors is that they need cooling to temperatures near that of liquid nitrogen (77K), to reduce noise due to thermally excited current carriers. MWIR HgCdTe cameras may be operated at temperatures accessible to thermoelectric coolers with a small performance penalty. Hence, HgCdTe infrared sensors are relatively heavy compared to bolometers and may require maintenance. A bolometer is a device for measuring the power of incident electromagnetic radiation via the heating of a material with a temperature-dependent electrical resistance. HgCdTe infrared sensors may provide a higher speed of detection (frame rate) than is possible with bolometers, and may be more sensitive than some cheaper alternatives.

HgCdTe may be a material of choice for detectors in Fourier-transform infrared (FTIR) spectrometers. This is because of the large spectral range of HgCdTe infrared sensors and also the high quantum efficiency. HgCdTe can also be used in a heterodyne detector, in which the interference between a local source and returned laser light is detected. In this case it can detect sources such as $CO_2$ lasers. In heterodyne detection mode a HgCdTe infrared sensor may be uncooled, although greater sensitivity may be achieved by cooling. Photodiodes, photoconductors or photoelectromagnetie (PEM) modes may also be used. A bandwidth well in excess of 1 GHz may be achieved with photodiode detectors.

Some alternatives to HgCdTe are less sensitive Si-based bolometers, Indium Antimonide (InSb) and photon-counting superconducting tunnel junction (STJ) arrays. Quantum well IR photodetectors (QWIP), manufactured from III-V semiconductor materials such as GaAs and AlGaAs, are another possible alternative, although their theoretical performance limits may be inferior to HgCdTe arrays at comparable temperatures and they may require the use of complicated reflection diffraction gratings to overcome certain polarization exclusion effects which may impact array responsivity. Other alternative temperature detection technologies may include Quantum Dot IR Photodetectors (QDIP), based on either a colloidal or type-II superlattice structure. Unique 3-D quantum confinement effects, combined with the unipolar (non-exciton based photoelectric behavior) nature of quantum dots could allow comparable performance to HgCdTe at significantly higher operating temperatures.

In HgCdTe infrared sensors, detection occurs when an IR photon of sufficient energy kicks an electron from the valence band to the conduction band. Such an electron is collected by a suitable external readout integrated circuits (ROIC) and transformed into an electric signal. The physical mating of the HgCdTe infrared sensor array to the ROIC may be referred to as a "focal plane array".

In contrast to the photon detection operational characteristics of HgCdTe infrared sensors, in a bolometer, light heats up a tiny piece of material. A bolometer is a different type of temperature detector from the HgCdTe infrared sensor since it is a device that measures the power of incident electromagnetic radiation via the heating of a material with a temperature-dependent electrical resistance. The temperature change of the bolometer results in a change in resistance which is measured and transformed into an electric signal. The differences in operational characteristics of these different types of temperature detectors may provide for an ultimately more accurate and reliable measurement of temperature when data from both types, or multiple different types of temperature detectors are processed, analyzed, and combined into an end result.

Semiconductor IR detectors made from Mercury Zinc Telluride may provide the advantages of better chemical, thermal, and mechanical stability characteristics than HgCdTe. The disadvantages of Mercury Zinc Telluride detectors may include a steeper, change of energy gap with mercury composition than is provided by HgCdTe, which may make compositional control more difficult.

Photovoltaic type sensors are devices based on crystalline or amorphous compounds that convert photons into photoelectrons or photocurrent, which forms a signal proportional to intensity over a range of wavelengths. Photovoltaic sensors may be applied to temperature measurements of wheels 130, 132, 134, 136 or wheel bearings 150, 152, 154, 156. The response times of these types of temperature detectors may be slower than the response time for semiconductor IR detectors made from HgCdTe, but may provide more accurate measurements when the HgCdTe IR sensor has not been cooled sufficiently to achieve its greatest sensitivity.

Piezoelectric type sensors contain asymmetric crystals that when strained along an axis will generate an electric field across their faces. If these faces are plated with metal, the electric field appears as a voltage. When the asymmetric crystals are heated, the temperature difference between their faces creates a strain coupled through a thermal expansion coefficient to produce a polarization and consequent charge separation and voltage. Piezoelectric sensors are also pyroelectric and vice versa.

Pyroelectric type sensors generate an electrical current on the surface of a material that is proportional to the rate at which the temperature of the material changes. Pyroelectric type sensors may be intrinsically sensitive to mechanical vibration and shocks, and therefore the output from these types of sensors may be susceptible to microphonics. Microphonics is a phenomenon wherein components in an electronic device may transform mechanical vibrations into an undesired electrical signal.

A sunlight sensor may also be used in various implementations of this disclosure to detect sun shot, or the undesired effects of sun shining into the IR detector. The sunlight sensor may screen the effects of sun shot from data collected and/or outputted by the temperature detector. Illustratively, if sun shot is detected to be primarily on one or more edges of a temperature detector data profile, it may have limited overlap with data indicative of wheel bearing temperature, and may be screened without reducing the true detection rate. If considerable overlap between the sun shot and data indicative of wheel bearing temperature exists, then two or more IR sensors—each facing in a direction different than the other—may be activated. Thereafter, data from the sunlight sensor can be used to ignore data collected by one or more of the two or more IR sensors.

Figure 4:
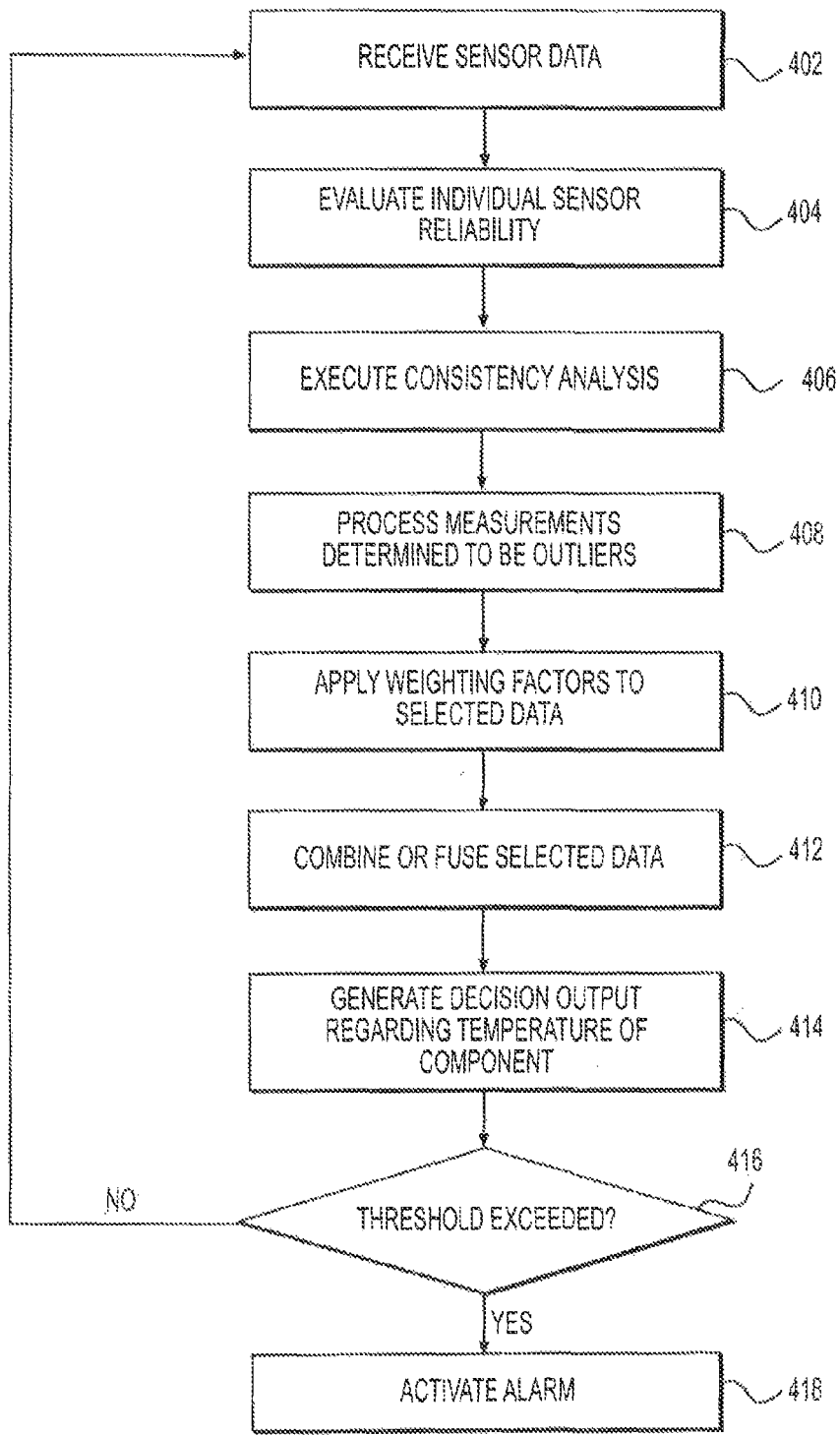
FIG. 4 is a flowchart depicting an exemplary disclosed method that may be performed by the system of FIGS. 2 and 3.

FIG. 4 is a flowchart depicting an exemplary disclosed method that may be performed by the system of FIGS. 2 and 3. FIG. 4 will be discussed in more detail below to further illustrate the disclosed concepts.

Industrial Applicability

The disclosed method and system may allow for increasing the advantages of certain technologies for detecting temperatures of wheels and wheel bearings on train cars, while also reducing the potential disadvantages of the various technologies. In accordance with various exemplary implementations, temperature data may be received from a variety of different types of temperature sensors, and the data may be combined to result in an output indicative of a temperature that may be more reliable and accurate than a temperature provided by only one type of temperature sensor or even multiple temperature sensors all of the same technological type.

As discussed above, various types of temperature sensors may provide different advantages and different disadvantages, or different strengths and different weaknesses, such that selecting more than one type of sensor to measure temperatures of train wheels and wheel bearings can provide a way of checking the consistency and reliability of the acquired data. A controller or processor may receive output signals from the various types of sensors, process the signals received from the sensors, and combine the results into one output that may be more accurate and reliable than the output from a single type of temperature sensor.

Various implementations of this disclosure may provide one or more technical results. For example, one technical result may be that computer code executed by a computer processor in accordance with various features of this disclosure may cause at least temperature data monitored by technologically different independent sensors to be fused and/or processed to determine whether one or more components of a system (or the entire system) is malfunctioning or operating properly. Another technical result is that this determination may be made with few or no false indications, which may lower the cost of operating the system being monitored, as well as improving the safety of the system. Yet another technical result may be the accurate detection of a defect or operating characteristic, or an emerging trend in certain detected characteristics to forecast and/or prevent accidents and/or damage to the system being monitored (or to one or more of its components).

Multi-sensor data fusion, such as performed in various implementations of this disclosure, may increase the accuracy with which a particularly quantity such as temperature can be measured. Features may be extracted from the data acquired at various levels in the process. Examples of features that may be extracted from the data acquired by infrared temperature sensors such as discussed in this disclosure may include temperature gradients detected across various portions of a wheel or wheel hearing. One non-limiting example may include the feature of a temperature gradient detected across a wheel bearing indicating that a back edge of the hearing where a grease seal backing ring is located may be hotter than the rest of the wheel bearing. This particular attribute may be considered normal for a wheel bearing, and therefore accurate detection of the temperature gradient may avoid the triggering of an alarm.

Sensor-level data fusion may combine data from the same or different types of sensors directly and thereafter perform feature extraction and declaration of faults or alarm events from the fused data. Feature-level data fusion may employ multiple different types of sensors to collect a particular kind of signal, such as the temperature gradient detected on a wheel bearing. Feature extraction may then be performed on the signal to obtain feature vectors, which may then be fused after processing as discussed in more detail below. An output of an alarm or fault declaration may be made based on the fused feature vectors. Declaration-level data fusion may involve each temperature detector independently producing an output such as an alarm or fault declaration. Subsequently, the outputs from all of the temperature detectors may be combined in accordance with different reliability algorithms such as Bayesian inference methods, voting methods, and other ad hoc methods.

Feature-level data fusion may also be applied to enhance correctness of the temperature measurements. Feature-level fusion may be used, wherein features that help discriminate and identify small distinctions among the objects being measured may be extracted from each individual sensor's data and then combined to form a composite feature vector representative of the object or component in each sensor's field of view. The composite feature vector may be input to a data processor or neural network, and characterization of the temperature profile of the object may then occur using a predetermined algorithm using various processing techniques. The processing techniques may recognize the object of interest as being, for example, a particular type of wheel hearing, and may differentiate the object from other objects that are not of interest or concern, such as other portions of trucks 122, 124.

As shown in FIG. 4, at step 402 temperature signal processor 310 (shown in FIG. 3) may receive sensor data from various types of sensors 314, 316, 318, 320, 322, 324. At step 404 the reliability of each individual sensor may be evaluated. A measure of the reliability of each individual sensor may be determined by consideration of parameters such as the signal-to-noise ratio for the sensor, the number of times a particular sensor has generated a signal that is inconsistent with signals received from other independent sensors, or the number of times a signal from the sensor has resulted in a false alarm.

At step 406, temperature signal processor 310 may execute a consistency analysis on the data received from different types of sensors 314, 316, 318, 320, 322, 324 provided for monitoring the temperatures of components on train 100. Temperature signal processor 310 may store data received from different types of sensors 314, 316, 318, 320, 322, 324 and associate that data with other characteristics or parameters such as the location where measurements are taken, ambient conditions, the speed of the train at the time measurements are taken, how heavy a load the train is carrying, and any history of measurements previously taken for an identifiable train 100, wheel 130, 132, 134, 136, or wheel bearing 150, 152, 154, 156. The consistency analysis may look for situations where a particular type of sensor is yielding results that are out of line with results received from all other types of sensors. An evaluation of inconsistencies between first and second signals received from first and second temperature sensors may include comparing the first and second signals received as indicative of the temperature of a component at substantially a same position on the component and at substantially the same point in time. Alternatively, an evaluation of inconsistencies between first and second signals received from first and second temperature sensors may include comparing the first and second signals received as indicative of the temperature of a component at substantially a same position on the component and at two different points in time. At step 408, the measurements from different types of sensors 314, 316, 318, 320, 322, 324 may be further processed to determine which, if any measurements are outliers in the data gathered. The outliers may then be disregarded.

At step 410, temperature signal processor 310 may apply weighting factors to select data from different types of sensors 314, 316, 318, 320, 322, 324 based on the results of other processing steps such as consistency analysis 406 and determination of outliers 408. Sensors found to be consistent in their readings may be given a greater weight than less consistent sensors. Other parameters may also be considered in assignment of different weighting factors to certain types of sensors 314, 316, 318, 320, 322, 324, such as the frequency of false alarms resulting from data produced by a particular type of sensor, frequency of maintenance required for a particular type of sensor, or other conditions that may potentially reduce the reliability of a particular type of sensor at a particular time or location.

At step 412, temperature signal processor 310 may combine or fuse selected data from different types of sensors 314, 316, 318, 320, 322, 324. One of ordinary skill in the art will recognize that not all of the different types of temperature sensors are necessarily provided for measuring temperatures of various components on a train 100, either at any one location, or at multiple positions along train track 170.

At step 414, temperature signal processor 310 and data fusion processor 360 (shown in FIG. 3) may generate a decision output 370 regarding the temperature of a component on train 100. Data gathered and processed by temperature signal processor 310 may be used to identify when certain control actions should be taken, such as stopping the train to perform maintenance, scheduling future maintenance, and performing autonomous control. At step 416, if the decision output has exceeded a threshold, then temperature signal processor 310 may generate an alarm at step 418. Otherwise the process may return to step 402 to receive more sensor data.

It will be apparent to those skilled in the art that various modifications and variations can be made to the disclosed temperature detecting system having redundant independent sensors without departing from the scope of the disclosure. Other embodiments of the temperature detecting system will be apparent to those skilled in the art from consideration of the specification and practice of the temperature detecting system disclosed herein. It is intended that the specification and examples be considered as exemplary only, with a true scope of the disclosure being indicated by the following claims and their equivalents.

What is claimed is:

1. A method for detecting a temperature of a component, the method comprising:
   receiving a first signal indicative of the temperature of the component, the first signal being received from a first temperature sensor, the first temperature sensor being a first technological type of temperature sensor having first principles of operation;
   receiving a second signal indicative of the temperature of the component, the second signal being received from a second temperature sensor, the second temperature sensor being a second technological type of temperature sensor having second principles of operation different from the first principles of operation;
   determining a reliability of the first and second signals by one or more of:
   (1) evaluating the consistency of the first and second signals,
   (2) determining whether one of the first and second signals is an outlier,
   (3) determining a signal-to-noise ratio for each of the first and second temperature sensors,
   (4) determining a false alarm rate associated with each of the first and second signals and
   (5) determining a frequency of maintenance required for each of the first and second temperature sensors; and
   combining the first and second signals after determining their reliability to generate an output indicative of the temperature of the component.

2. The method of claim 1, further including adaptively weighting at least one of the first and second signals before combining the first and second signals.

3. The method of claim 1, wherein determining the reliability of the first and second signals includes evaluating a false alarm rate associated with the first and second signals.

4. The method of claim 1, wherein combining the first and second signals includes averaging the first and second signals.

5. The method of claim 1, further including evaluating inconsistencies between the first and second signals before combining the first and second signals.

6. The method of claim 5, wherein evaluating inconsistencies between the first and second signals includes comparing the first and second signals received as indicative of the temperature of the component at substantially a same position on the component and at substantially a same point in time.

7. The method of claim 5, wherein evaluating inconsistencies between the first and second signals includes comparing the first and second signals received as indicative of the temperature of the component at substantially a same position on the component and at two different points in time.

8. A method for detecting a temperature of a component, the method comprising:
   receiving a first signal indicative of the temperature of the component, the first signal being received from a first technological type of temperature sensor having first principles of operation;
   receiving a second signal indicative of the temperature of the component, the second signal being received from a second technological type of temperature sensor having second principles of operation different from the first principles of operation;
   determining a reliability of the first and second signals,
   adaptively weighting one of the first and second signals determined to have a higher reliability than the reliability of the other of the first and second signals with a greater weight; and combining the first and second signals to generate an output indicative of the temperature of the component.

9. A system for detecting the temperature of a component, the system comprising:
   at least two types of temperature sensors, each employing a different technological type of temperature sensing technology relying on a different principle of operation; and
   a processor configured to
      determine a reliability of a first signal from a first one of the two types of temperature sensors;
      determine a reliability of a second signal from a second one of the two types of temperature sensors; and
      combine the first signal and the second signal after determining their reliability to generate an output indicative of the temperature of the component.

10. The system of claim 9, wherein the processor is further configured to adaptively weight at least one of the first and second signals before combining the first and second signals.

11. The system of claim 9, wherein the processor is configured to determine the reliability of the first and second signals by determining a signal-to-noise ratio for each of the first and second temperature sensors.

12. The system of claim 9, wherein the processor is configured to determine the reliability of the first and second signals by evaluating a false alarm rate associated with the first and second signals.

13. The system of claim 9, wherein the processor is configured to combine the first and second signals by averaging the first and second signals.

14. The system of claim 9, wherein the processor is further configured to combine the first and second signals by adaptively weighting one of the first and second signals determined to have a higher reliability than the reliability of the other of the first and second signals with a greater weight.

15. The system of claim 9, wherein the processor is further configured to evaluate inconsistencies between the first and second signals before combining the first and second signals.

16. The system of claim 15, wherein the processor is configured to evaluate inconsistencies between the first and second signals by comparing the first and second signals received as indicative of the temperature of the component at substantially a same position on the component and at substantially the same point in time.

17. The system of claim 15, wherein the processor s configured to evaluate inconsistencies between the first and second signals by comparing the first and second signals received as indicative of the temperature of the component at substantially a same position on the component and at two different points in time.

* * * * *